(12) United States Patent
Uchimura et al.

(10) Patent No.: US 11,245,308 B2
(45) Date of Patent: Feb. 8, 2022

(54) MOTOR PROVIDED WITH DECELERATION MECHANISM

(71) Applicant: MITSUBA Corporation, Gunma (JP)

(72) Inventors: Hiroyuki Uchimura, Gunma (JP); Ryo Kumakura, Gunma (JP); Naruhito Ogino, Gunma (JP); Takeshi Nishi, Gunma (JP)

(73) Assignee: MITSUBA Corporation, Gunma (JP)

( * ) Notice: Subject to any disclaimer, the term of this patent is extended or adjusted under 35 U.S.C. 154(b) by 144 days.

(21) Appl. No.: 16/622,276

(22) PCT Filed: Mar. 15, 2018

(86) PCT No.: PCT/JP2018/010216
§ 371 (c)(1),
(2) Date: Dec. 12, 2019

(87) PCT Pub. No.: WO2018/230059
PCT Pub. Date: Dec. 20, 2018

(65) Prior Publication Data
US 2020/0204037 A1  Jun. 25, 2020

(30) Foreign Application Priority Data
Jun. 15, 2017 (JP) .............................. JP2017-117322

(51) Int. Cl.
*H02K 7/11* (2006.01)
*H02K 7/116* (2006.01)
(Continued)

(52) U.S. Cl.
CPC ........... *H02K 7/1166* (2013.01); *H02K 5/148* (2013.01); *E05Y 2900/55* (2013.01); *F16H 1/16* (2013.01);
(Continued)

(58) Field of Classification Search
CPC .... H02K 7/1166; H02K 5/148; H02K 11/215; E05Y 2900/55; F16H 1/16; F16H 55/12; F16H 2057/02034; F16H 2057/0213
See application file for complete search history.

(56) References Cited

U.S. PATENT DOCUMENTS 6,408,572 B1 * 6/2002 Uchimura ............. E05F 11/485
464/92
6,431,317 B1 * 8/2002 Coe ......................... F16D 21/02
185/38
(Continued)

FOREIGN PATENT DOCUMENTS

JP    2002372128    12/2002
JP    2003139220    5/2003
(Continued)

OTHER PUBLICATIONS

"International Search Report (Form PCT/ISA/210) of PCT/JP2018/010216," dated Jun. 12, 2018, with English translation thereof, pp. 1-3.

*Primary Examiner* — Zakaria Elahmadi
(74) *Attorney, Agent, or Firm* — JCIPRNET (57) ABSTRACT

On one side of a worm wheel (46) in an axial direction, first thinned portions (46e) recessed toward the other side of the worm wheel (46) in the axial direction are arranged. Further, on the one side of the worm wheel (46) in the axial direction, reinforcing portions (46h) reinforcing areas between the first thinned portions (46e) and tooth portions (45) of the worm wheel (46) are arranged. Therefore, it is possible to reduce a weight of the worm wheel (46) and to suppress occurrence of distortion of the tooth portions (45) by the first thinned portions (46e). In addition, it is possible to sufficiently increase the strength of the worm wheel (46) in the vicinity of the tooth portions (45) by the reinforcing portions (46h).

6 Claims, 8 Drawing Sheets

(51) Int. Cl.
*H02K 5/14* (2006.01)
*H02K 11/215* (2016.01)
*F16H 1/16* (2006.01)
*F16H 55/22* (2006.01)
*F16H 57/02* (2012.01)
*F16H 57/021* (2012.01)

(52) U.S. Cl.
CPC ...... *F16H 55/22* (2013.01); *F16H 2057/0213* (2013.01); *F16H 2057/02034* (2013.01); *H02K 11/215* (2016.01)

(56) References Cited

U.S. PATENT DOCUMENTS

| | | | | |
|---|---|---|---|---|
| 10,982,721 | B2* | 4/2021 | Oosawa | B62D 5/0409 |
| 2001/0010280 | A1* | 8/2001 | Torii | F16D 43/02 |
| | | | | 192/38 |
| 2001/0017496 | A1* | 8/2001 | Torii | F16D 41/105 |
| | | | | 310/77 |
| 2002/0047376 | A1* | 4/2002 | Torii | F16H 1/16 |
| | | | | 310/83 |
| 2002/0047379 | A1* | 4/2002 | Torii | H02K 7/1166 |
| | | | | 310/89 |
| 2007/0283628 | A1* | 12/2007 | Gotou | H02K 7/108 |
| | | | | 49/360 |
| 2008/0022477 | A1* | 1/2008 | Ota | B60S 1/166 |
| | | | | 15/250.34 |
| 2008/0087123 | A1* | 4/2008 | Li | F16H 57/039 |
| | | | | 74/425 |
| 2008/0245636 | A1* | 10/2008 | Gotou | H02K 7/108 |
| | | | | 192/48.3 |
| 2010/0000355 | A1* | 1/2010 | Yamashita | F16H 1/16 |
| | | | | 74/409 |
| 2011/0057526 | A1* | 3/2011 | Kokubu | H02K 5/10 |
| | | | | 310/83 |
| 2011/0133584 | A1* | 6/2011 | Uchimura | H02K 7/1166 |
| | | | | 310/83 |
| 2017/0058991 | A1* | 3/2017 | Kim | F16D 3/68 |
| 2018/0216719 | A1* | 8/2018 | Kim | F16H 57/028 |
| 2019/0106146 | A1* | 4/2019 | Sung | F16H 55/14 |
| 2019/0334410 | A1* | 10/2019 | Uchimura | F16D 3/68 |

FOREIGN PATENT DOCUMENTS

| | | |
|---|---|---|
| JP | 2012017831 | 1/2012 |
| JP | 2015127162 | 7/2015 |

* cited by examiner

MOTOR PROVIDED WITH DECELERATION MECHANISM

CROSS-REFERENCE TO RELATED APPLICATION

This application is a 371 application of the International PCT application serial no. PCT/JP2018/010216, filed on Mar. 15, 2018, which claims the priority benefits of Japan Patent Application No. 2017-117322, filed on Jun. 15, 2017. The entirety of the abovementioned patent applications is hereby incorporated by reference herein and made a part of this specification.

BACKGROUND OF THE INVENTION

Technical Field

The present invention relates to a motor provided with deceleration mechanism which decelerates and outputs rotation of an armature shaft.

Related Art

Conventionally, a motor provided with deceleration mechanism which is small in size and obtains a large output has been used as a driving source of a power window device, a sunroof device, etc. installed in a vehicle such as an automobile. The motor provided with deceleration mechanism is driven by an operation of an operation switch and the like in an interior of the vehicle, thereby opening/closing the window glass, the sunroof, etc.

For example, a technology described in patent literature 1 has been known as the motor provided with deceleration mechanism used for the driving source of the power window device, the sunroof device, etc. The motor provided with deceleration mechanism described in patent literature 1 includes a motor unit and a gear unit. The motor unit is provided with an armature shaft, and the gear unit is provided with a worm rotated by the armature shaft and a worm wheel including tooth portions meshed with the worm.

Further, among components configuring the motor provided with deceleration mechanism, the worm wheel is a large component, and a worm wheel made of resin is used for weight reduction. On the other hand, as for the worm wheel made of resin, defects such as a "sink mark" or a "void" may occur during molding of the worm wheel. To prevent occurrence of the defects, thinned portions recessed in an axial direction of the worm wheel are arranged on one side and the other side of the worm wheel in the axial direction and in a thick-wall part around a gear teeth, respectively. In this way, a reduction in the weight of the worm wheel is realized and occurrence of distortion of the gear teeth is prevented.

LITERATURE OF RELATED ART

Patent Literature

Patent Literature 1: Japanese Patent Laid-open No. 2012-017831

SUMMARY

Problems to be Solved

However, when the motor provided with deceleration mechanism described in patent literature 1 is applied to a vehicle such as a minivan having a heavy window glass, the following problem may occur.

For example, when the window glass is closed, a large load (weight of the window glass) is applied to the worm wheel in a rotation direction. At this time, since the worm is stopped, a rotational force of the worm wheel does not rotate the worm. Therefore, the large load applied in the rotation direction of the worm wheel acts to widen a pitch between the gear teeth of the worm wheel.

A plurality of thinned portions is arranged in the vicinity of the gear teeth to prevent the occurrence of the "sink mark" or the "void" as described above. Therefore, in a case of application to a vehicle such as a minivan having a heavy window glass, there is a possibility that the vicinity of the gear teeth may have insufficient strength. In other words, even though the worm wheel of the motor provided with deceleration mechanism described in patent literature 1 is excellent in formability, there is a possibility of insufficient strength.

An object of the present invention is to provide a motor provided with deceleration mechanism capable of sufficiently increasing the strength of the worm wheel as well as reducing the weight of the worm wheel and improving molding precision.

Means to Solve Problems

An aspect of the present invention is a motor provided with deceleration mechanism for decelerating and outputting rotation of an armature shaft, the motor provided with deceleration mechanism including: a worm rotated by the armature shaft; a worm wheel having tooth portions meshed with the worm; one-side thinned portions arranged on one side of the worm wheel in an axial direction and recessed toward the other side of the worm wheel in the axial direction; and reinforcing portions arranged on the one side of the worm wheel in the axial direction and reinforcing areas between the one-side thinned portions and the tooth portions of the worm wheel.

In another aspect of the present invention, a bulged portion is arranged in a part of the tooth portions close to the reinforcing portions along the axial direction of the worm wheel and is bulged to an outside of the worm wheel in a radial direction with respect to the other part of the tooth portions.

In another aspect of the present invention, the one-side thinned portions are arranged on an inside of the worm wheel in the radial direction with respect to the reinforcing portions, and the one-side thinned portions and the reinforcing portions are overlapped with each other when the worm wheel is viewed from the radial direction.

In another aspect of the present invention, other-side thinned portions recessed toward the one side of the worm wheel in the axial direction are arranged on the other side of the worm wheel in the axial direction, and the other-side thinned portions are arranged at the same positions as positions of the one-side thinned portions along the radial direction of the worm wheel.

In another aspect of the present invention, the one-side thinned portions and the other-side thinned portions are alternately arranged in a circumferential direction of the worm wheel.

In another aspect of the present invention, one side of the tooth portions in a longitudinal direction is arranged on the other side of the worm wheel in the axial direction with respect to one side of the one-side thinned portions in a longitudinal direction, and the reinforcing portions are inclined to descend to the other side of the worm wheel in the axial direction toward the outside of the worm wheel in the radial direction.

In another aspect of the present invention, a storing portion that stores torque receiving portions of an output member and damper pieces of a damper member is arranged on the inside of the worm wheel in the radial direction with respect to the one-side thinned portions, and a torque output portion that transmits a rotational force of the worm wheel to the torque receiving portions via the damper pieces is arranged in the storing portion.

Effect

According to the present invention, on one side of the worm wheel in the axial direction, one-side thinned portions recessed toward the other side of the worm wheel in the axial direction are arranged. Further, on the one side of the worm wheel in the axial direction, reinforcing portions reinforcing areas between the one-side thinned portions and tooth portions of the worm wheel are arranged.

Therefore, it is possible to reduce the weight of the worm wheel and to suppress occurrence of distortion of the tooth portions by the first thinned portions. In addition, it is possible to sufficiently increase the strength of the worm wheel in the vicinity of the tooth portions by the reinforcing portions.

DESCRIPTION OF THE EMBODIMENTS

Hereinafter, a first embodiment of the present invention will be described in detail with reference to drawings.

Figure 1:
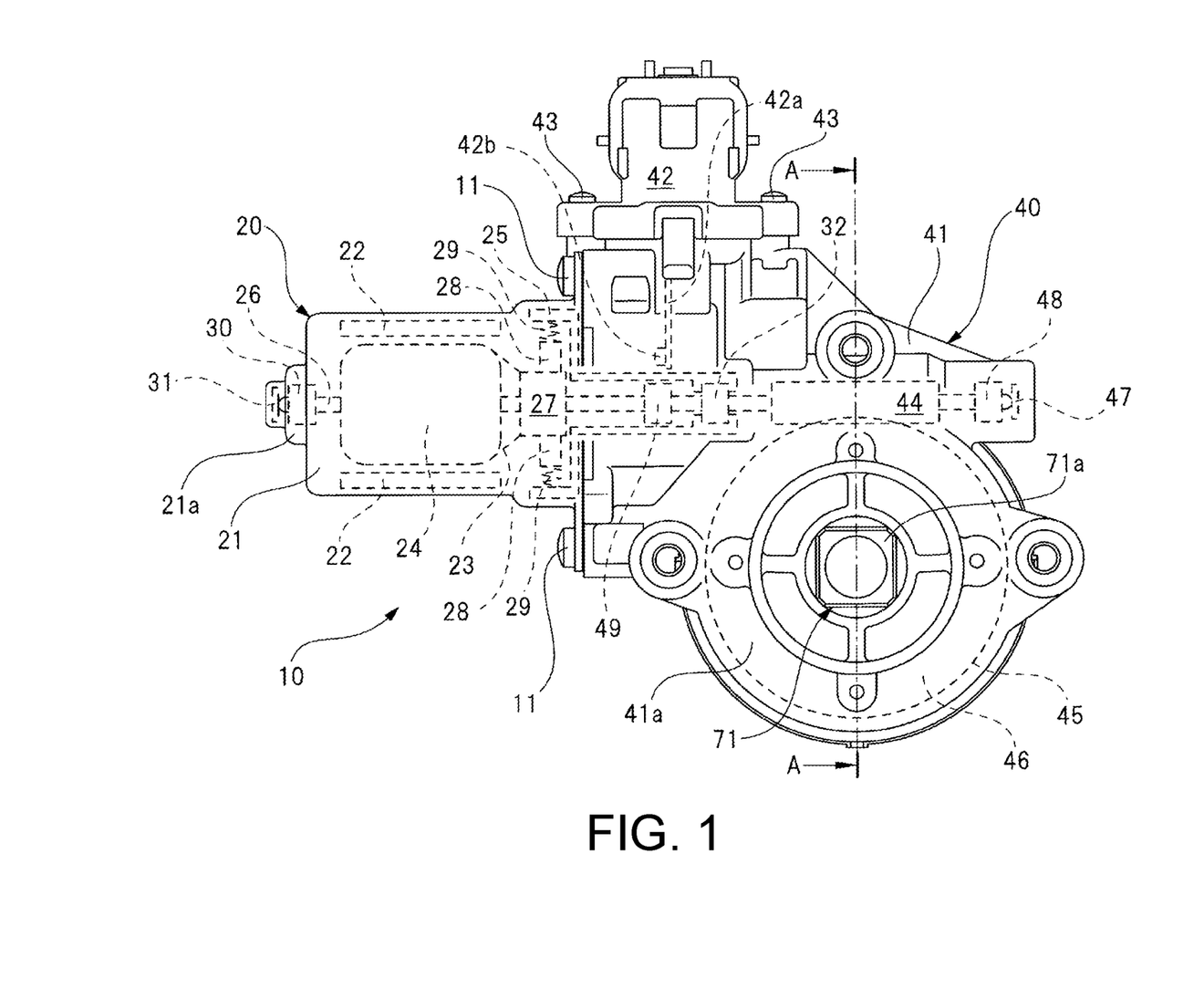
FIG. 1 is a partial cross-sectional view illustrating a motor provided with deceleration mechanism according to the present invention.
Figure 2:
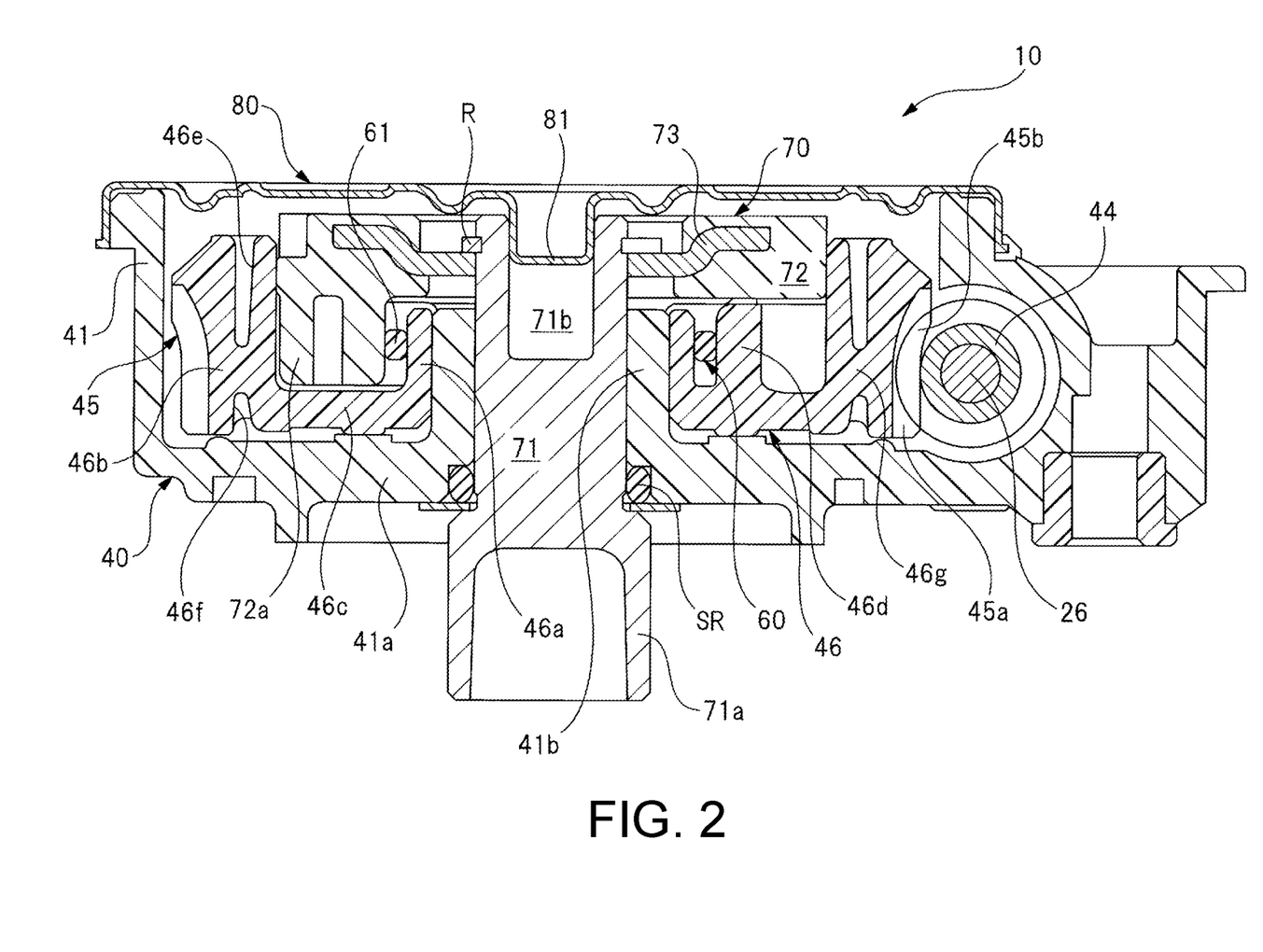
FIG. 2 is a cross-sectional view taken along A-A line of FIG. 1.
Figure 3:
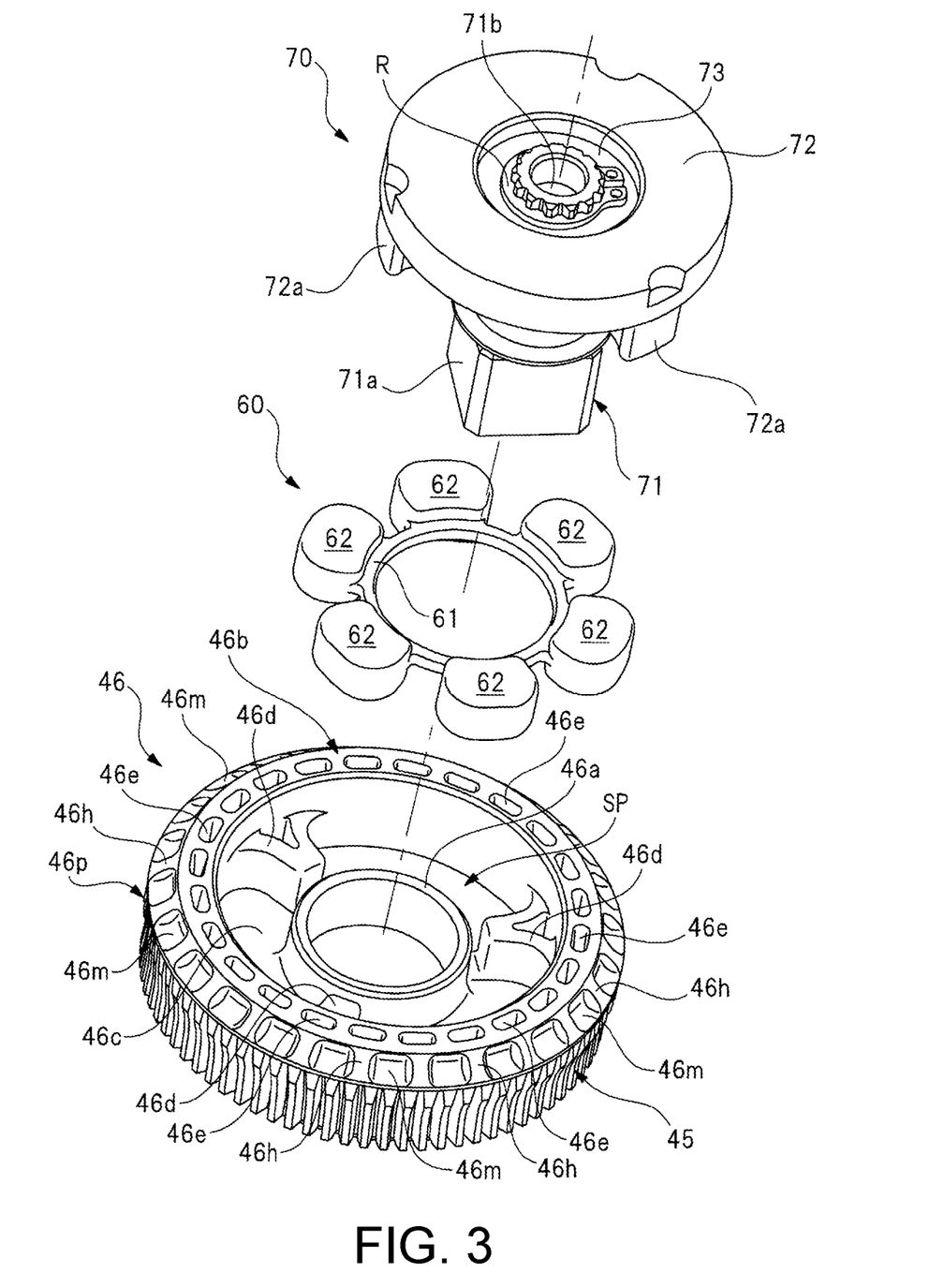
FIG. 3 is an exploded perspective view illustrating a worm wheel, a damper member, and an output member.
Figure 4A:
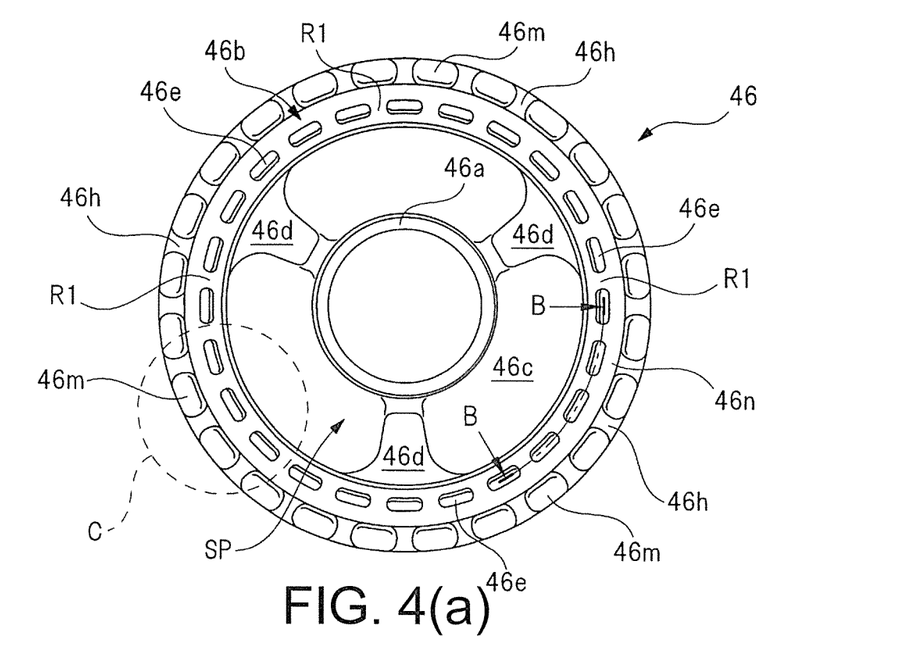
FIG. 4(a) and FIG. 4(b) are plan views illustrating detailed structures of a front side and a back side of the worm wheel.
Figure 4B:
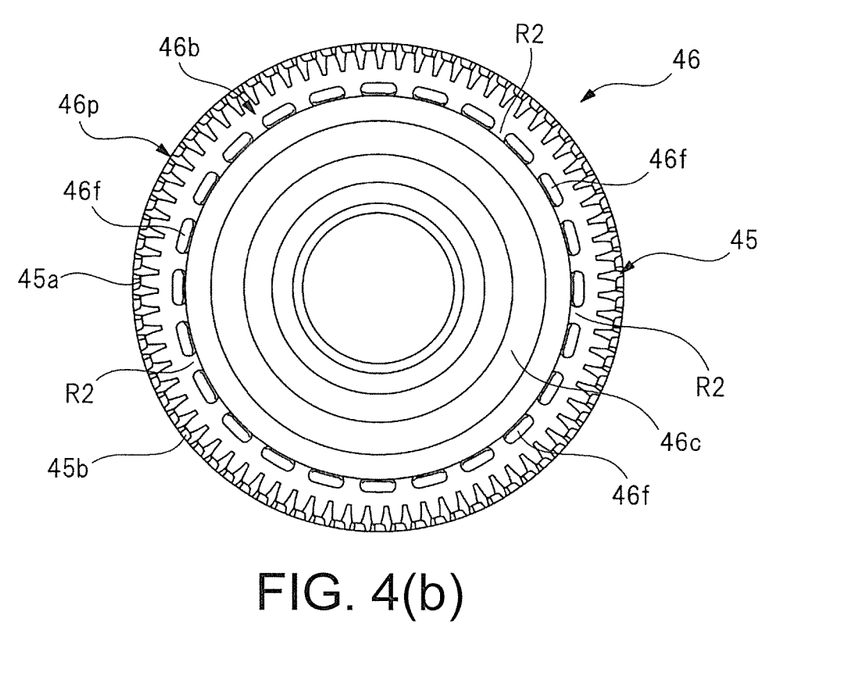
Figure 5:
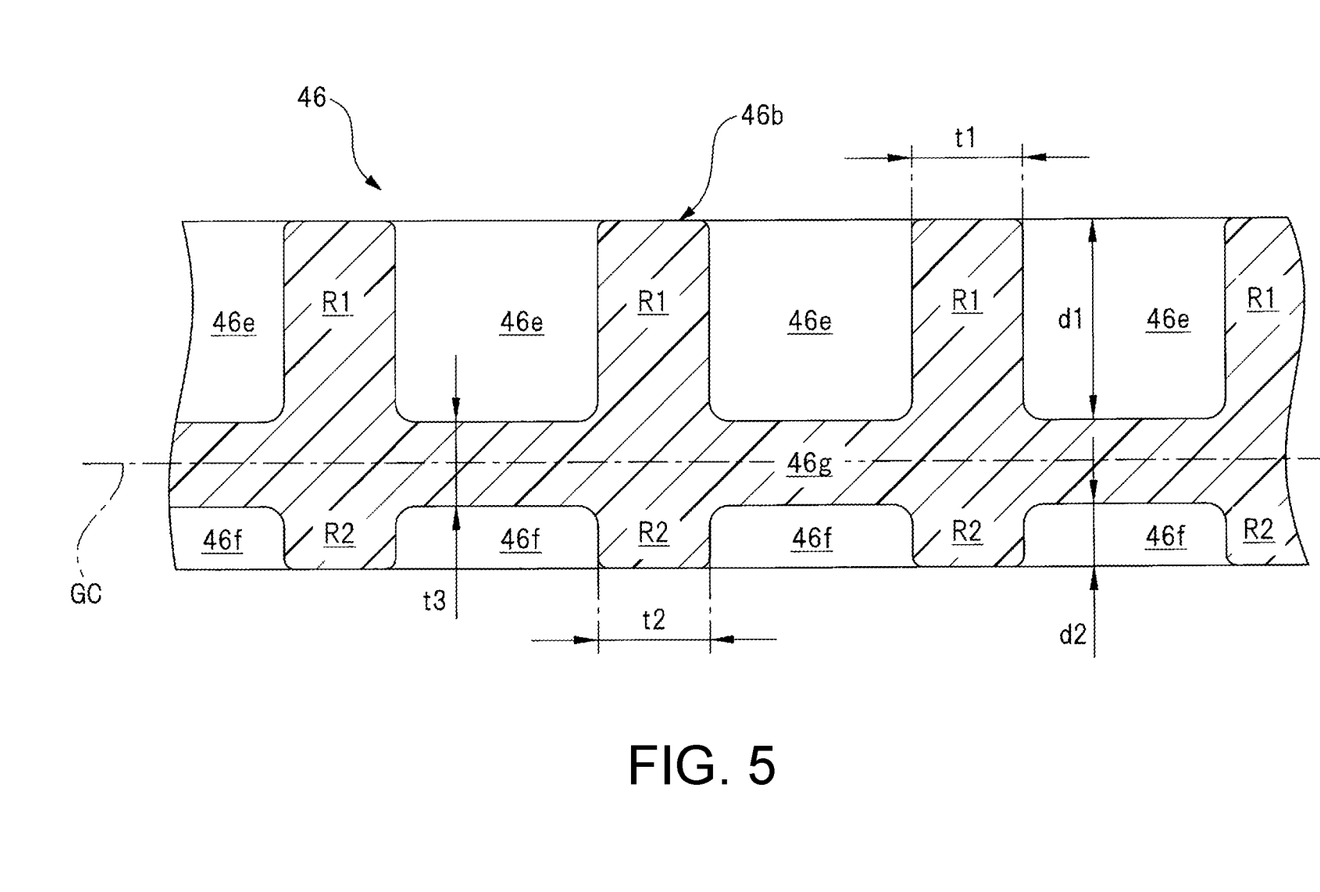
FIG. 5 is a cross-sectional view taken along B-B line of FIG. 4(a).
Figure 6:
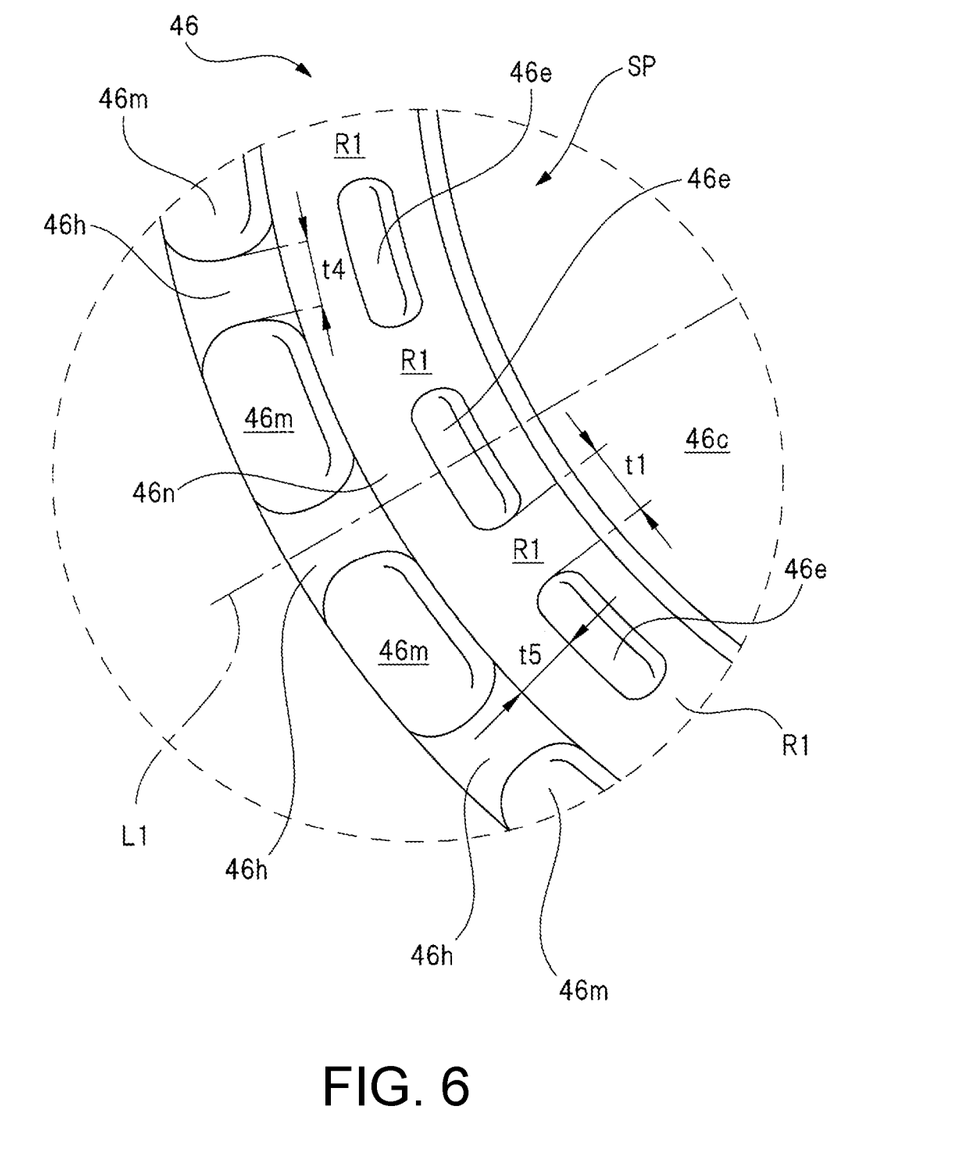
FIG. 6 is an enlarged view of a broken-line circle C portion of FIG. 4(a).
Figure 7:
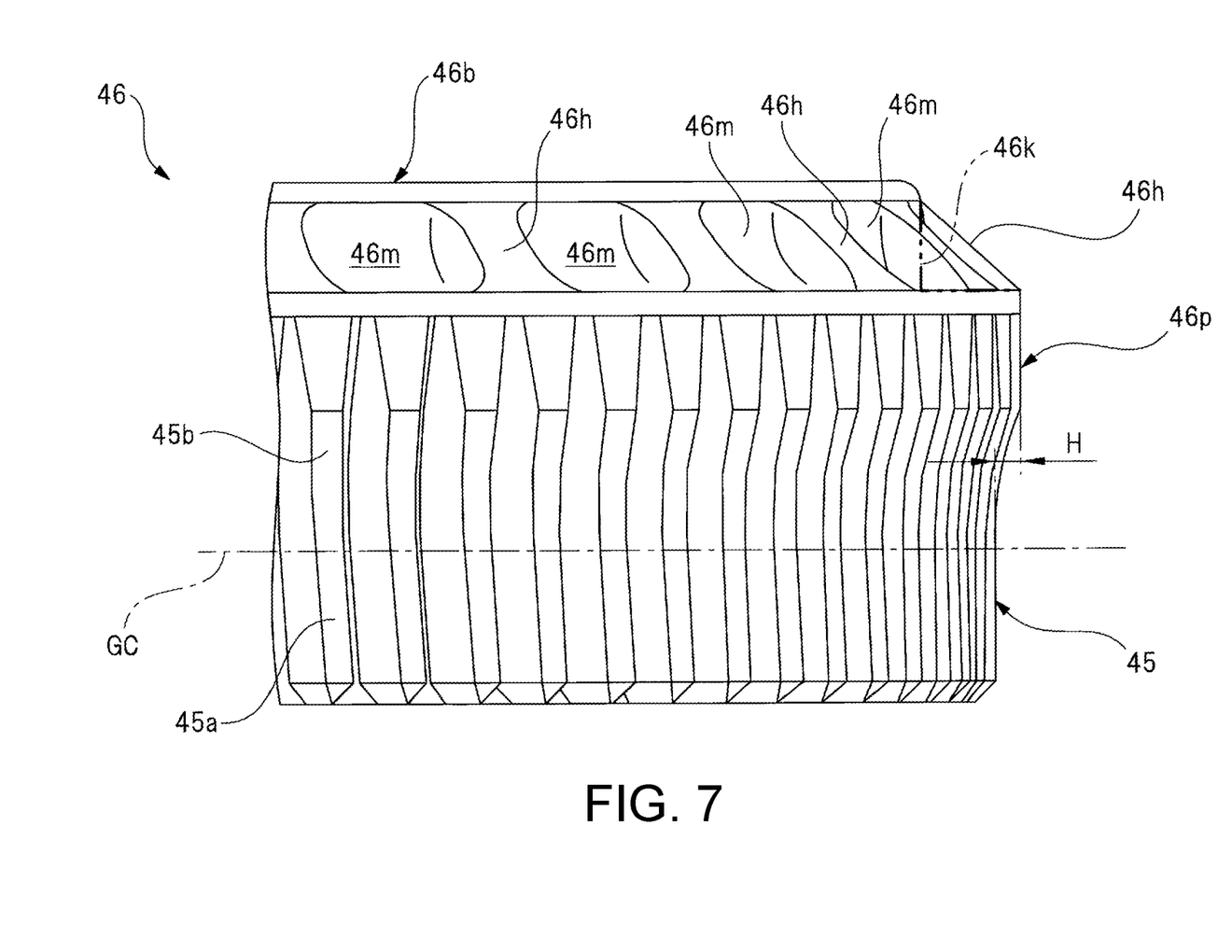
FIG. 7 is a partially enlarged view of the worm wheel as viewed from a lateral side.

FIG. 1 illustrates a partial cross-sectional view illustrating a motor provided with deceleration mechanism according to the present invention. FIG. 2 illustrates a cross-sectional view taken along A-A line of FIG. 1. FIG. 3 illustrates an exploded perspective view illustrating a worm wheel, a damper member, and an output member. FIG. 4(a) and FIG. 4(b) illustrate plan views illustrating detailed structures of a front side and a back side of the worm wheel. FIG. 5 illustrates a cross-sectional view taken along B-B line of FIG. 4(a). FIG. 6 illustrates an enlarged view of a broken-line circle C portion of FIG. 4(a). FIG. 7 illustrates a partially enlarged view of the worm wheel as viewed from a lateral side.

The motor provided with deceleration mechanism 10 illustrated in FIG. 1 is used as a driving source of a power window device installed in a vehicle such as an automobile to drive a window regulator (not illustrated) that raises and lowers window glass. The motor provided with deceleration mechanism 10 is installed in a narrow space inside a door of the vehicle, and thus has a flat shape as illustrated in FIG. 2. The motor provided with deceleration mechanism 10 includes a motor unit 20 and a gear unit 40, and the motor unit 20 and the gear unit 40 are integrated (unitized) by a plurality of fastening screws 11 (only two fastening screws are illustrated in FIG. 1).

As illustrated in FIG. 1, the motor unit 20 includes a motor case 21. The motor case 21 is formed in a bottomed tubular shape by performing deep drawing or the like on a steel plate made of a magnetic material. A plurality of magnets 22 (only two magnets are illustrated in the diagram) having a substantially arc-shaped cross section is arranged inside the motor case 21.

In addition, an armature 24 around which a coil 23 is wound is arranged on an inner side of each magnet 22 so as to be rotatable through a predetermined gap. Besides, a brush holder 25 is attached to an opening side (right side in the diagram) of the motor case 21, and the brush holder 25 blocks the opening side of the motor case 21.

An armature shaft 26 is fixed to a rotation center of the armature 24. A commutator 27 is arranged at a portion of the armature shaft 26 adjacent to the armature 24, and an end of the coil 23 wound around the armature 24 is electrically connected to the commutator 27.

A pair of brushes 28 held by the brush holder 25 is in sliding contact with an outer peripheral portion of the commutator 27. Each brush 28 is brought into elastic contact with the commutator 27 at a predetermined pressure by a spring member 29 respectively. Accordingly, a drive current is supplied to each brush 28 from an in-vehicle controller (not illustrated), and a rotational force (electromagnetic force) is generated in the armature 24. Therefore, the armature shaft 26 is rotated in a predetermined rotation direction and at predetermined rotation number.

A bottom side (left side in the diagram) of the motor case 21 is formed in a stepped shape, and a bottomed stepped portion 21a having a smaller diameter than that of a main body of the motor case 21 is arranged in the stepped-shaped portion. A first radial bearing 30 is mounted on the bottomed stepped portion 21a, and the first radial bearing 30 rotatably supports one side (left side in the diagram) of the armature shaft 26 in the axial direction. In addition, a first thrust bearing 31 is arranged on a bottom side of the bottomed stepped portion 21a, and the first thrust bearing 31 restricts movement of the armature shaft 26 toward the axial direction.

A second radial bearing 32 is mounted on the brush holder 25. The second radial bearing 32 rotatably supports a central portion of the armature shaft 26 in the axial direction.

The gear unit 40 includes a gear case 41 and a connector member 42 attached to the gear case 41. The gear case 41 is formed in a predetermined shape by injection-molding a resin material such as plastic, and is fixed to the opening side of the motor case 21 by the plurality of fastening screws 11. Moreover, the connector member 42 is inserted into a lateral side of the gear case 41 at a distal end side of the connector member 42 and is fixed to the gear case 41 by a pair of fixing screws 43 in this state.

The other side (right side in the diagram) of the armature shaft 26 in the axial direction extends inside the gear case 41, and a worm 44 is fixed to the other side of the armature shaft 26 in the axial direction and an outer peripheral part thereof. In addition, a worm wheel 46 in which tooth portions 45 meshed with the worm 44 are arranged on an outer peripheral portion is rotatably stored inside the gear case 41. Here, the worm 44 is formed in a spiral shape, and the tooth portions 45 are inclined at a gentle inclination angle in the axial direction of the worm wheel 46. In this way, a rotational force of the worm 44 is smoothly transmitted to the worm wheel 46.

A second thrust bearing 47 that restricts movement of the armature shaft 26 toward the axial direction is arranged inside the gear case 41 on the other side of the armature shaft 26 in the axial direction. In addition, the other side of the armature shaft 26 in the axial direction is rotatably supported by a third radial bearing 48.

As described above, the first radial bearing 30 and the first thrust bearing 31 are arranged on the one side of the armature shaft 26 in the axial direction, the second radial bearing 32 is arranged at the central portion of the armature shaft 26 in the axial direction, and the third radial bearing 48 and the second thrust bearing 47 are arranged on the other side of the armature shaft 26 in the axial direction, and thereby the armature shaft 26 (armature 24) can rotate efficiently and smoothly.

A sensor magnet 49 being annular is integrally arranged between the commutator 27 and the second radial bearing 32 along the axial direction of the armature shaft 26. The sensor magnet 49 is magnetized so that N poles and S poles are alternately arranged along a circumferential direction. Meanwhile, a sensor substrate 42a is arranged inside the connector member 42, and a rotation sensor 42b is mounted on a portion of the sensor substrate 42a facing the sensor magnet 49.

Here, the rotation sensor 42b is a magnetic sensor that recognizes directions of magnetic flux lines of the sensor magnet 49 and changes of the directions. In this way, the rotation sensor 42b can detect a rotation state of the armature shaft 26, that is, a rotation direction or a rotation speed of the armature shaft 26. More specifically, the rotation sensor 42b is a GMR sensor that includes a magnetoresistive element (MR element) serving as a sensor element and further applies a giant magneto resistance effect.

The in-vehicle controller detects a detection signal from the rotation sensor 42b and calculates a rotation state of the armature shaft 26. For example, when the rotation speed of the armature shaft 26 decreases, the in-vehicle controller determines that an obstacle is in contact with the window glass. Then, a control operation to suspend or reverse rotational drive of the motor provided with deceleration mechanism 10 is executed.

As illustrated in FIG. 2, a support tube 41b that rotatably supports the worm wheel 46 is integrally arranged on a bottom portion 41a of the gear case 41. The support tube 41b protrudes toward the inner side of the gear case 41, and an output shaft 71 that forms an output member 70 is rotatably supported on the inner side of the support tube 41b in a radial direction. Further, a distal end side (lower side in the diagram) of the output shaft 71 is exposed to the outside of the gear case 41.

As illustrated in FIG. 2 and FIG. 3, a damper member 60 and the output member 70 are attached to the worm wheel 46. In addition, the worm wheel 46, the damper member 60, and the output member 70 are attached from the opening side (the upper side in FIG. 2) of the gear case 41 in a state of being respectively integrated, that is, in a sub-assembled state. In this way, assembly workability of the motor provided with deceleration mechanism 10 is improved by integrating (sub-assembling) each of the worm wheel 46, the damper member 60, and the output member 70 in advance.

The damper member 60 is formed of an elastic material such as rubber, and includes a main body 61 being annular and six damper pieces 62 arranged integrally with the main body 61. The six damper pieces 62 are arranged at substantially equal intervals (intervals of approximately 60°) in a circumferential direction of the main body 61 and protrude outward in the radial direction of the main body 61. Here, the damper member 60 including the main body 61 and the six damper pieces 62 is stored in a storing portion SP (see FIG. 3) of the worm wheel 46.

Further, three torque output portions 46d arranged integrally with the worm wheel 46 and three torque receiving portions 72a (only two torque receiving portions are illustrated in FIG. 3) arranged integrally with a disc member 72 of the output member 70 alternately enter the area between adjacent damper pieces 62 along a circumferential direction of the damper member 60. Accordingly, when the worm wheel 46 is rotated in forward and reverse directions, the rotational torque is transmitted from the torque output portions 46d to the torque receiving portions 72a via the damper pieces 62. In this instance, the damper pieces 62 are elastically deformed, and an impact caused by a rapid change in the rotational torque is alleviated.

The output member 70 includes a substantially columnar output shaft 71 made of steel or the like, and a seal ring SR is arranged between the output shaft 71 and the support tube 41b. Accordingly, rainwater and the like are prevented from entering the inside of the gear case 41 from the bottom portion 41a side. In addition, a connecting portion 71a formed in a substantially cubic shape having a bottom is integrally arranged at a distal end portion of the output shaft 71 exposed to the outside. Besides, a drum (not illustrated) forming a window regulator is connected to the connecting portion 71a so that power can be transmitted.

The disc member 72 made of a resin material such as plastic is fixed to a base end portion of the output shaft 71 stored in the gear case 41. More specifically, a base material 73 made of steel is embedded in a central portion of the disc member 72 by insert molding, and the base material 73 is fixed to the base end portion of the output shaft 71 by serration fitting (details not illustrated). In this way, the rotational force from the disc member 72 is efficiently transmitted to the output shaft 71. Moreover, the disc member 72 is prevented from coming out of the output shaft 71 by a retaining ring R.

The three torque receiving portions 72a respectively entering the area between the adjacent damper pieces 62 are integrally arranged on the worm wheel 46 side (lower side in the diagram) of the disc member 72. These torque receiving portions 72a are disposed at substantially equal intervals (intervals of approximately 120°) along the circumferential direction of the disc member 72. Here, the three torque receiving portions 72a are stored in the storing portion SP of the worm wheel 46.

The opening side (upper side in FIG. 2) of the gear case 41 is sealed with a case cover 80. The case cover 80 is formed in a substantially disc shape by pressing a stainless steel plate, etc., and a convex portion 81 protruding toward the output shaft 71 side is arranged at a central portion of the case cover 80. The convex portion 81 slidably enters a concave portion 71b formed on the base end side of the output shaft 71. Accordingly, rainwater and the like is prevented from entering the inside of the gear case 41 from the opening side, and rotational shake of the output shaft 71 is suppressed.

Here, a power transmission path of the motor provided with deceleration mechanism 10 will be described. First, rotation of the armature shaft 26 is decelerated by the worm 44 and the worm wheel 46 (deceleration mechanism). Subsequently, a rotational force decelerated and increased in torque is transmitted from the torque output portions 46*d* to the torque receiving portions 72*a* via the damper member 60. Thereafter, the rotational force is transmitted from the output shaft 71 to a gear or a drum arranged in the window regulator connected to the connecting portion 71*a*, and the window glass is raised and lowered.

As illustrated in FIG. 2 to FIG. 7, the worm wheel 46 is formed in a bottomed tubular shape. Specifically, the worm wheel 46 is formed in a substantially disc shape by abutting a pair of upper mold and lower mold and injecting a molten resin material into a cavity formed inside each mold. Besides, the worm wheel 46 includes a small-diameter cylindrical portion 46*a* rotatably attached to the support tube 41*b* of the gear case 41, a large-diameter cylindrical portion 46*b* in which the tooth portions 45 are formed on an outer peripheral portion, and a bottom portion 46*c* connecting the small-diameter cylindrical portion 46*a* and the large-diameter cylindrical portion 46*b* to each other.

The storing portion SP being annular is formed in a space surrounded by an outer peripheral part of the small-diameter cylindrical portion 46*a*, an inner peripheral part of the large-diameter cylindrical portion 46*b*, and the bottom portion 46*c*. That is, the storing portion SP being annular is arranged on the inner side of the worm wheel 46 in the radial direction with respect to a first thinned portion 46*e* arranged in the large-diameter cylindrical portion 46*b*.

Besides, the three torque output portions 46*d* protruding in the axial direction of the worm wheel 46 and protruding inward in the radial direction of the worm wheel 46 are arranged inside the storing portion SP. The torque output portions 46*d* are arranged integrally with the worm wheel 46 and enter the area between the adjacent damper pieces 62. In addition, the torque output portions 46*d* are formed in a substantially triangular shape having a sharp point toward the small-diameter cylindrical portion 46*a*, and are disposed at substantially equal intervals (intervals of approximately) 120° along the circumferential direction of the bottom portion 46*c*.

Here, the three torque output portions 46*d* have a function of transmitting, via the damper pieces 62 of the damper member 60, the rotational force of the worm wheel 46 to the torque receiving portions 72*a* forming the output member 70.

As illustrated in FIG. 2 and FIG. 5, a plurality of first thinned portions (one-side thinned portions) 46*e* arranged in the circumferential direction of the worm wheel 46 is arranged on one side (upper side in the diagram) of the large-diameter cylindrical portion 46*b* in the axial direction and in the vicinity of the tooth portions 45. The first thinned portions 46*e* are recessed toward the other side of the worm wheel 46 (lower side in the diagram) in the axial direction. Further, a total of twenty four first thinned portions 46*e* are arranged on the one side of the large-diameter cylindrical portion 46*b* in the axial direction so as to be substantially equally spaced (with intervals of approximately 15°) in the circumferential direction of the large-diameter cylindrical portion 46*b*.

In addition, a plurality of second thinned portions (other-side thinned portions) 46*f* arranged in the circumferential direction of the worm wheel 46 is arranged on the other side (lower side in the diagram) of the large-diameter cylindrical portion 46*b* in the axial direction and in the vicinity of the tooth portions 45. The second thinned portions 46*f* are recessed toward one side of the worm wheel 46 (upper side in the diagram) in the axial direction. Further, a total of twenty four second thinned portions 46*f* are arranged on the other side of the large-diameter cylindrical portion 46*b* in the axial direction so as to be substantially equally spaced (with intervals of approximately 15°) in the circumferential direction of the large-diameter cylindrical portion 46*b*.

Here, the second thinned portions 46*f* are arranged at the same positions as the positions of the first thinned portions 46*e* along the radial direction of the worm wheel 46. In addition, a depth dimension d1 of the first thinned portions 46*e* along the axial direction of the worm wheel 46 is approximately three times a depth dimension d2 of the second thinned portions 46*f* along the axial direction of the worm wheel 46 (d1≈3×d2).

Further, a meshing support portion 46*g* extending in the circumferential direction of the worm wheel 46 is arranged between the first thinned portions 46*e* and the second thinned portions 46*f* along the axial direction of the worm wheel 46. The meshing support portion 46*g* is a portion that supports meshing of the worm 44 with the tooth portions 45, and ensures the rigidity of a meshing center GC of the worm wheel 46. In other words, the meshing support portion 46*g* has a function of suppressing a decrease in rigidity of the worm wheel 46 due to arrangement of the first thinned portions 46*e* and the second thinned portions 46*f*.

In addition, the twenty four first thinned portions 46*e* and the twenty four second thinned portions 46*f* are arranged to have the same phases in the circumferential direction of the large-diameter cylindrical portion 46*b* (worm wheel 46). That is, as illustrated in FIG. 5, the first thinned portions 46*e* and the second thinned portions 46*f* are arranged at the same positions along the circumferential direction of the large-diameter cylindrical portion 46*b*.

As described above, the first thinned portions 46*e* and the second thinned portions 46*f* are arranged to have the same phases in the circumferential direction of the large-diameter cylindrical portion 46*b*, and thereby each of a thickness t1 of a first rib R1 between adjacent first thinned portions 46*e* and a thickness t2 of a second rib R2 between adjacent second thinned portions 46*f* is made thin to make the thicknesses substantially uniform. Furthermore, a thickness t3 of the meshing support portion 46*g* is set to be substantially the same as the thicknesses t1 and t2 of the first and second ribs R1 and R2. In this way, occurrence of defects such as a "sink mark" or a "void" in the vicinity of the tooth portions 45 is effectively suppressed.

As illustrated in FIG. 3 and FIG. 7, a plurality of reinforcing portions 46*h* reinforcing areas between the first thinned portions 46*e* and the tooth portions 45 of the worm wheel 46 is arranged on the one side of the large-diameter cylindrical portion 46*b* (worm wheel 46) in the axial direction. The reinforcing portions 46*h* radially extend outward in the radial direction around the small-diameter cylindrical portion 46*a* and are disposed between the first thinned portions 46*e* arranged inside the worm wheel 46 in the radial direction and the tooth portions 45 arranged outside the worm wheel 46 in the radial direction.

An annular stepped portion 46*k* extending in the circumferential direction of the worm wheel 46 is formed between the first thinned portions 46*e* and the tooth portions 45 as indicated by a thick two-dot chain line (imaginary line) of FIG. 7. Here, one side (upper side in the diagram) of the tooth portions 45 in a longitudinal direction is arranged on the other side (lower side in the diagram) of the worm wheel 46 in the axial direction with respect to one side (upper side in the diagram) of the first thinned portions 46e in the longitudinal direction. In this way, the annular stepped portion 46k is formed between the one side of the tooth portions 45 in the longitudinal direction and the one side of the first thinned portions 46e in the longitudinal direction. Besides, a total of twenty four reinforcing portions 46h are arranged at substantially equal intervals (intervals of approximately 15°) on the annular stepped portion 46k along the circumferential direction of the annular stepped portion 46k.

More specifically, as illustrated in FIG. 7, the plurality of reinforcing portions 46h arranged on the annular stepped portion 46k is inclined to descend to the other side (lower side in the diagram) of the worm wheel 46 in the axial direction toward the outside (right side in the diagram) of the worm wheel 46 in the radial direction. That is, the reinforcing portions 46h are respectively inclined in a substantially slide-like shape toward the outside of the worm wheel 46 in the radial direction. In this manner, by inclining the reinforcing portions 46h in a substantially slide-like shape, an outline of the worm wheel 46 is prevented from being enlarged.

Besides, as illustrated in FIG. 6, third thinned portions 46m are formed between adjacent reinforcing portions 46h, and (a total of twenty four) third thinned portions 46m and the first thinned portions 46e are alternately arranged in the circumferential direction of the worm wheel 46 respectively. In this way, the reinforcing portions 46h and the first thinned portions 46e are respectively arranged on a line segment L1 passing through the central portion of the worm wheel 46 and extending in the radial direction of the worm wheel 46.

That is, the first thinned portions 46e are arranged on the inside of the worm wheel 46 in the radial direction with respect to the reinforcing portions 46h, and the first thinned portions 46e and the reinforcing portions 46h are overlapped with each other when the worm wheel 46 is viewed from the radial direction.

Accordingly, each of the thickness t1 of the first rib R1 between adjacent first thinned portions 46e and a thickness t4 of the reinforcing portions 46h is made thin to make the thicknesses substantially uniform. Further, a thickness dimension t5 of a shoulder portion 46n between the first thinned portions 46e and the reinforcing portions 46h along the radial direction of the worm wheel 46 is also substantially the same as the thicknesses of the first rib R1 and the reinforcing portions 46h. Therefore, in the vicinity of the first thinned portions 46e and around the tooth portions 45, occurrence of the defects such as the "sink mark" or the "void" is suppressed, and the strength of the part is improved.

Further, as illustrated in FIG. 3 and FIG. 7, in a part of the tooth portions 45 close to the reinforcing portions 46h along the axial direction of the worm wheel 46, a bulged portion 46p bulged to the outside of the worm wheel 46 in the radial direction with respect to the other part of the tooth portions 45 is arranged. More specifically, the tooth portions 45 are formed of linear tooth portions 45a and curved tooth portions 45b, and the curved tooth portions 45b are disposed in the bulged portion 46p.

Here, a protrusion height of the bulged portion 46p to the outside in the radial direction is set as H with reference to a tooth tip portion of the linear tooth portions 45a. Specifically, the protrusion height H is set to a size that is approximately ⅓ of a total tooth depth of the linear tooth portions 45a. In this way, the strength of the worm wheel 46 around the curved tooth portions 45b is improved.

Moreover, as illustrated in FIG. 2, the worm 44 is meshed with both the linear tooth portions 45a and the curved tooth portions 45b of the tooth portions 45. Therefore, a contact area of a meshing part of the worm 44 and the tooth portions 45 is increased and the meshing strength between the worm 44 and the tooth portions 45 is improved. By improving the meshing strength in this way, the stress concentration on the tooth portions 45 from the worm 44 is alleviated, early wear of the tooth portions 45 and rattling of the worm 44 and the tooth portions 45 are eliminated, and transmission efficiency of the rotational force is improved.

As described above in detail, according to the motor provided with deceleration mechanism 10 of the present embodiment, on the one side of the worm wheel 46 in the axial direction, the first thinned portions 46e recessed toward the other side of the worm wheel 46 in the axial direction are arranged. Further, on the one side of the worm wheel 46 in the axial direction, the reinforcing portions 46h reinforcing areas between the first thinned portions 46e and the tooth portions 45 of the worm wheel 46 are arranged.

Therefore, the first thinned portions 46e can reduce the weight of the worm wheel 46 and can suppress occurrence of distortion in the tooth portions 45. Further, the strength of the worm wheel 46 in the vicinity of the tooth portions 45 can be sufficiently increased by the reinforcing portions 46h.

In addition, according to the motor provided with deceleration mechanism 10 of the present embodiment, in a part of the tooth portions 45 close to the reinforcing portions 46h along the axial direction of the worm wheel 46, the bulged portion 46p bulged to the outside in the radial direction of the worm wheel 46 with respect to the other part of the tooth portions 45 is arranged. Thus, it is possible to increase the strength of the worm wheel 46 around the curved tooth portions 45b.

Further, by arranging the bulged portion 46p, the tooth portions 45 can be formed of the linear tooth portions 45a and the curved tooth portions 45b, and the worm 44 can be meshed with both the linear tooth portions 45a and the curved tooth portions 45b. Therefore, the contact area of the meshing part of the worm 44 and the tooth portions 45 is increased, and the meshing strength of the worm 44 and the tooth portions 45 is improved. Consequently, it is possible to alleviate the stress concentration on the tooth portions 45 from the worm 44, eliminate early wear of the tooth portions 45 and rattling of the worm 44 and the tooth portions 45, and improve the transmission efficiency of the rotational force.

In addition, according to the motor provided with deceleration mechanism 10 of the present embodiment, the first thinned portions 46e are arranged on the inside of the worm wheel 46 in the radial direction with respect to the reinforcing portions 46h, and the first thinned portions 46e and the reinforcing portions 46h are overlapped with each other when the worm wheel 46 is viewed from the radial direction.

Accordingly, each of the thickness t1 of the first rib R1 and the thickness t4 of the reinforcing portions 46h can made thin to make the thicknesses substantially uniform. In addition, the thickness dimension t5 of the shoulder portion 46n can also be made substantially the same as the thicknesses of the first rib R1 and the reinforcing portions 46h. Therefore, in the vicinity of the first thinned portions 46e and around the tooth portions 45, occurrence of the defects such as the "sink mark" or the "void" can be suppressed and the strength of the part can be improved.

Further, according to the motor provided with deceleration mechanism 10 of the present embodiment, the second thinned portions 46f recessed toward the one side of the worm wheel 46 in the axial direction are arranged on the other side of the worm wheel 46 in the axial direction, and the second thinned portions 46f are arranged at the same positions as the positions of the first thinned portions 46e along the radial direction of the worm wheel 46 and arranged to have the same phases as the phases of the first thinned portions 46e in the circumferential direction of the worm wheel 46.

Accordingly, each of the thickness t1 of the first rib R1 and the thickness t2 of the second rib R2 can be made thin, and the thicknesses can be made substantially uniform. In addition, the thickness t3 of the meshing support portion 46g can also be made substantially the same as the thicknesses of the first and second ribs R1 and R2. Therefore, occurrence of the defects such as the "sink mark" or the "void" in the vicinity of the tooth portions 45 can be more effectively suppressed.

In addition, according to the motor provided with deceleration mechanism 10 of the present embodiment, the one side of the tooth portions 45 in the longitudinal direction is arranged on the other side of the worm wheel 46 in the axial direction with respect to one side of the first thinned portions 46e in the longitudinal direction, and the reinforcing portions 46h are inclined to descend to the other side of the worm wheel 46 in the axial direction toward the outside of the worm wheel 46 in the radial direction.

Accordingly, the reinforcing portions 46h can be inclined in a substantially slide-like shape toward the outside of the worm wheel 46 in the radial direction. Consequently, the outline of the worm wheel 46 can be prevented from being enlarged.

Further, according to the motor provided with deceleration mechanism 10 of the present embodiment, the storing portion SP that stores the torque receiving portions 72a forming the output member 70 and the damper pieces 62 of the damper member 60 is arranged inside in the radial direction with respect to the first thinned portions 46e of the worm wheel 46, and the torque output portions 46d that transmit the rotational force of the worm wheel 46 to the torque receiving portions 72a through the damper pieces 62 are arranged in the storing portion SP.

Accordingly, even when the rotational torque of the armature shaft 26 rapidly changes, an impact caused by the change can be alleviated. Therefore, silence of the motor provided with deceleration mechanism 10 can be improved. In addition, the meshed portion of the worm 44 and the tooth portions 45 can be protected from the impact. Consequently, the life of the motor provided with deceleration mechanism 10 can be extended.

Next, a second embodiment of the present invention will be described in detail with reference to the drawings. Moreover, portions having the same function as that in the first embodiment described above are denoted by the same reference numerals, and detailed description thereof is omitted.

Figure 8:
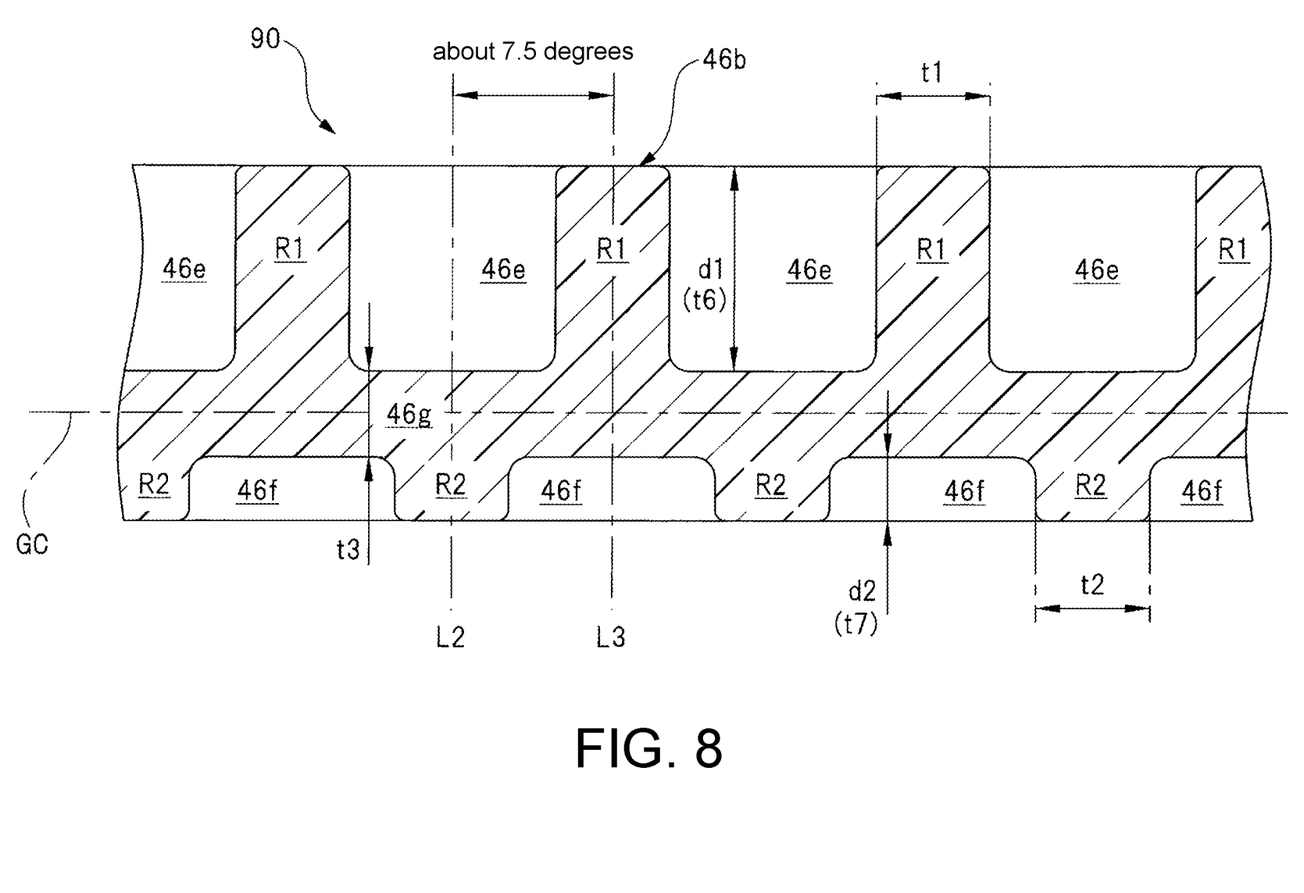
FIG. 8 is a cross-sectional view of a worm wheel of a second embodiment and corresponds to FIG. 5.

FIG. 8 illustrates a cross-sectional view of a worm wheel of the second embodiment and corresponds to FIG. 5.

As illustrated in FIG. 8, a worm wheel 90 of the second embodiment is different from the worm wheel 46 of the first embodiment (see FIG. 5) in that a plurality of first thinned portions (one-side thinned portions) 46e and a plurality of second thinned portions (other-side thinned portions) 46f are alternately arranged on one side and the other side of the worm wheel 90 in an axial direction so as to alternately appear in a circumferential direction of the large-diameter cylindrical portion 46b (worm wheel 90).

Specifically, an interval between a line segment L2 passing through a central portion of the first thinned portions 46e and extending in the axial direction of the worm wheel 90 and a line segment L3 passing through a central portion of the second thinned portions 46f and extending in the axial direction of the worm wheel 90 corresponds to an interval of about 7.5 degrees along the circumferential direction of the worm wheel 90.

In the worm wheel 90 of the second embodiment formed as described above, the same effects as those of the first embodiment described above can be achieved.

In addition, in the second embodiment, since the first thinned portions 46e and the second thinned portions 46f are alternately arranged in the circumferential direction of the worm wheel 90, it is possible to decrease each of a thickness t6 (=d1) of a portion of the first rib R1 along the axial direction of the worm wheel 90 and a thickness t7 (=d2) of a portion of the second rib R2 along the axial direction of the worm wheel 90 when compared with the first embodiment.

Therefore, it is possible to more effectively suppress occurrence of the defects such as the "sink mark" or the "void" in the vicinity of the tooth portions 45 (see FIG. 2).

The present invention is not limited to the above-described embodiments, and various modifications can be made without departing from the scope of the invention. For example, in each of the above embodiments, each of the worm wheels 46 and 90 is formed by injection-molding a resin material such as plastic. However, the present invention is not limited thereto, and is also applicable to a worm wheel made of other materials that may cause the "sink mark" or the "void", for example, a worm wheel formed by cast-molding an aluminum material and the like.

In addition, in each of the above embodiments, the motor provided with deceleration mechanism 10 is used as a driving source of the power window device installed in the vehicle. However, the present invention is not limited thereto, and the motor 10 may also be used as another driving source of a sunroof device or the like.

Further, in each of the above embodiments, an electric motor having a brush is employed for the motor unit 20. However, the present invention is not limited thereto. For example, a brushless electric motor or the like may be employed for the motor unit 20.

In addition, the material, shape, dimensions, number, installation location, etc. of each component in each of the above embodiments are arbitrary and not limited to the form in the above embodiments as long as the present invention can be achieved.

INDUSTRIAL APPLICABILITY

The motor provided with deceleration mechanism is used as a driving source of a power window device installed in a vehicle such as an automobile to drive a window regulator that raises and lowers window glass.

What is claimed is:

1. A motor provided with deceleration mechanism for decelerating and outputting rotation of an armature shaft, the motor provided with deceleration mechanism comprising:
   a worm rotated by the armature shaft;
   a worm wheel having a large-diameter cylindrical portion in which tooth portions are formed on an outer peripheral portion;
   a plurality of first thinned portions arranged on one side of the large-diameter cylindrical portion in an axial direction and recessed toward the other side of the worm wheel in the axial direction so as to be substantially equally spaced in the circumferential direction of the worm wheel;

a plurality of another thinned portions arranged on the one side of the large-diameter cylindrical portion in the axial direction, recessed toward the other side of the worm wheel in the axial direction, and arranged to the outside of the worm wheel in a radial direction with respect to the first thinned portions so as to be substantially equally spaced in the circumferential direction of the worm wheel;

an annular stepped portion formed between the first thinned portions and the tooth portions and extending in the circumferential direction of the worm wheel; and reinforcing portions arranged on the one side of the large-diameter cylindrical portion in the axial direction and arranged on the annular stepped portion along the circumferential direction of the annular stepped portion, overlapped with the first thinned portions when the worm wheel is viewed from the radial direction, arranged between the adjacent another thinned portions, and reinforcing areas between the first thinned portions and the tooth portions, wherein the another thinned portions and the reinforcing portions are overlapped with the tooth portions when the worm wheel is viewed from the axial direction.

2. The motor provided with deceleration mechanism according to claim 1, wherein a bulged portion is arranged in a part of the tooth portions close to the reinforcing portions along the axial direction of the worm wheel and is bulged to an outside of the worm wheel in a radial direction with respect to the other part of the tooth portions.

3. The motor provided with deceleration mechanism according to claim 1, wherein second thinned portions recessed toward the one side of the worm wheel in the axial direction are arranged on the other side of the large-diameter cylindrical portion in the axial direction, and the second thinned portions are arranged at the same positions as positions of the first thinned portions along the radial direction of the worm wheel.

4. The motor provided with deceleration mechanism according to claim 3, wherein the first thinned portions and the second thinned portions are alternately arranged in a circumferential direction of the worm wheel.

5. The motor provided with deceleration mechanism according to claim 1, wherein one side of the tooth portions in a longitudinal direction is arranged on the other side of the worm wheel in the axial direction with respect to one side of the first thinned portions in a longitudinal direction, and the reinforcing portions are inclined to descend to the other side of the worm wheel in the axial direction toward the outside of the worm wheel in the radial direction.

6. The motor provided with deceleration mechanism according to claim 1, wherein a storing portion that stores torque receiving portions of an output member and damper pieces of a damper member is arranged on the inside of the worm wheel in the radial direction with respect to the first thinned portions, and a torque output portion that transmits a rotational force of the worm wheel to the torque receiving portions via the damper pieces is arranged in the storing portion.

* * * * *